United States Patent [19]
Sloot

[11] Patent Number: 5,923,483
[45] Date of Patent: Jul. 13, 1999

[54] SELF-ATTACHABLE WHEEL SPOKE REFLECTOR

[75] Inventor: Alexander Sloot, Sugarloaf, Pa.

[73] Assignee: Printmark Industries, Inc., Hazelton, Pa.

[21] Appl. No.: 08/874,990

[22] Filed: Jun. 12, 1997

[51] Int. Cl.⁶ .............................. G02B 7/182; G02B 5/12
[52] U.S. Cl. ........................ 359/871; 359/881; 359/842; 359/523; 359/524
[58] Field of Search ..................................... 359/871, 881, 359/842, 521, 523, 524

[56] References Cited

U.S. PATENT DOCUMENTS

| D. 369,568 | 5/1996 | Sloot . | |
|---|---|---|---|
| 5,239,396 | 8/1993 | Thompson | 359/1 |
| 5,287,221 | 2/1994 | Sun | 359/523 |
| 5,446,984 | 9/1995 | Kulp et al. | 40/610 |

FOREIGN PATENT DOCUMENTS 2430346  3/1980  France ................................. 359/523

OTHER PUBLICATIONS

Light Up Your Life: The Reflectix Line Personal Safety Products, asi 81233, 1995, 2ⁿᵈ Edition, pp. 5 and 21.
Children Should Be Seen and Not Hurt, Reflective Products for Family Safety, 1992 The Reflectix Line, asi #81233, pp. 8, 9 and 16.

*Primary Examiner*—Cassandra Spyrou
*Assistant Examiner*—Mohammad Y. Sikder
*Attorney, Agent, or Firm*—St. Onge Steward Johnston & Reens LLC

[57] ABSTRACT

A self-attachable wheel spoke reflector is provided. The self-attachable wheel spoke reflector includes removable from sheet of reflectors. A preferred embodiment of the present invention is that the material be thermoplastic and most preferably vinyl. Another embodiment is that the self-attachable wheel spoke reflector be adhesive-backed.

6 Claims, 5 Drawing Sheets

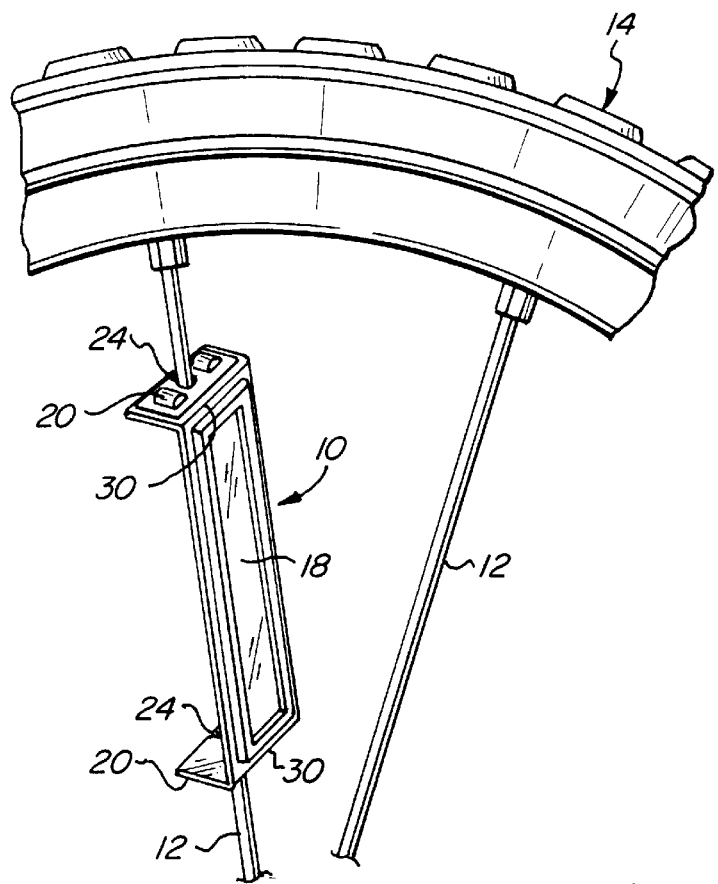
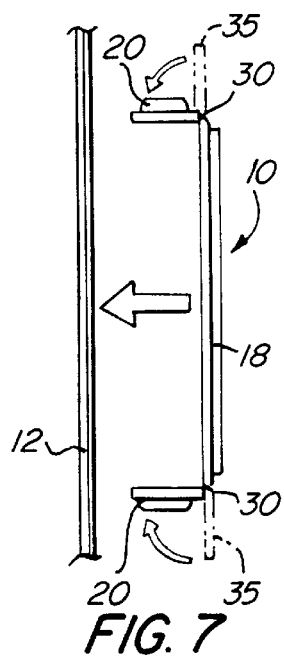
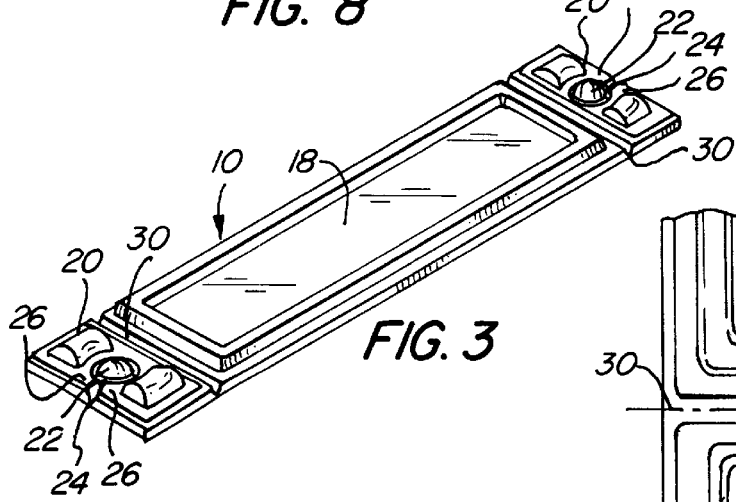
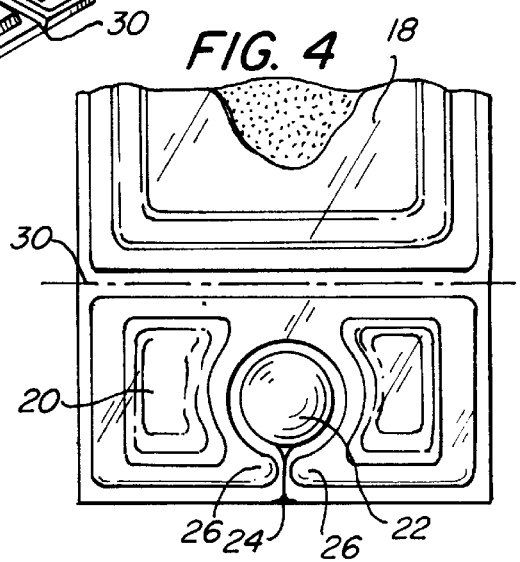
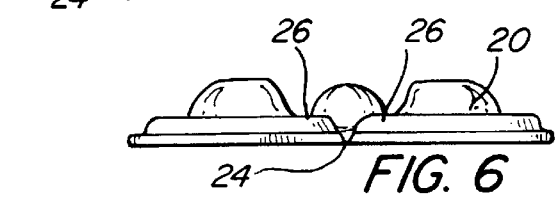

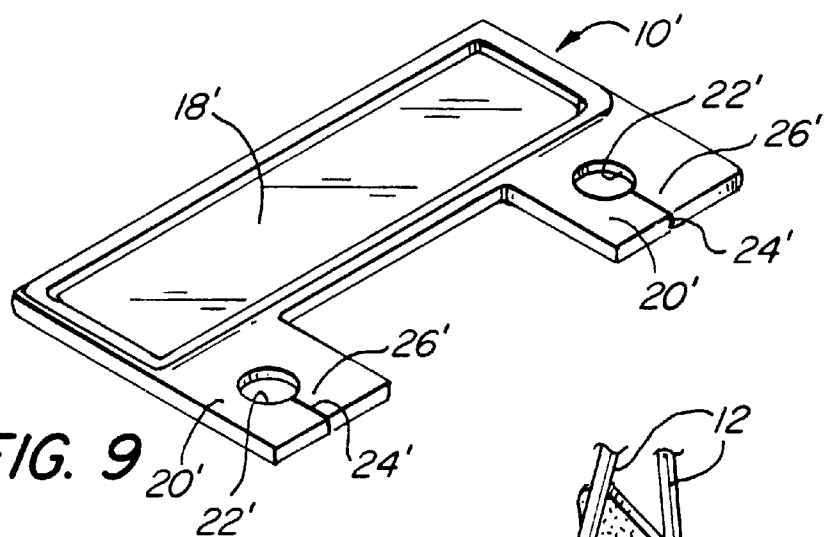
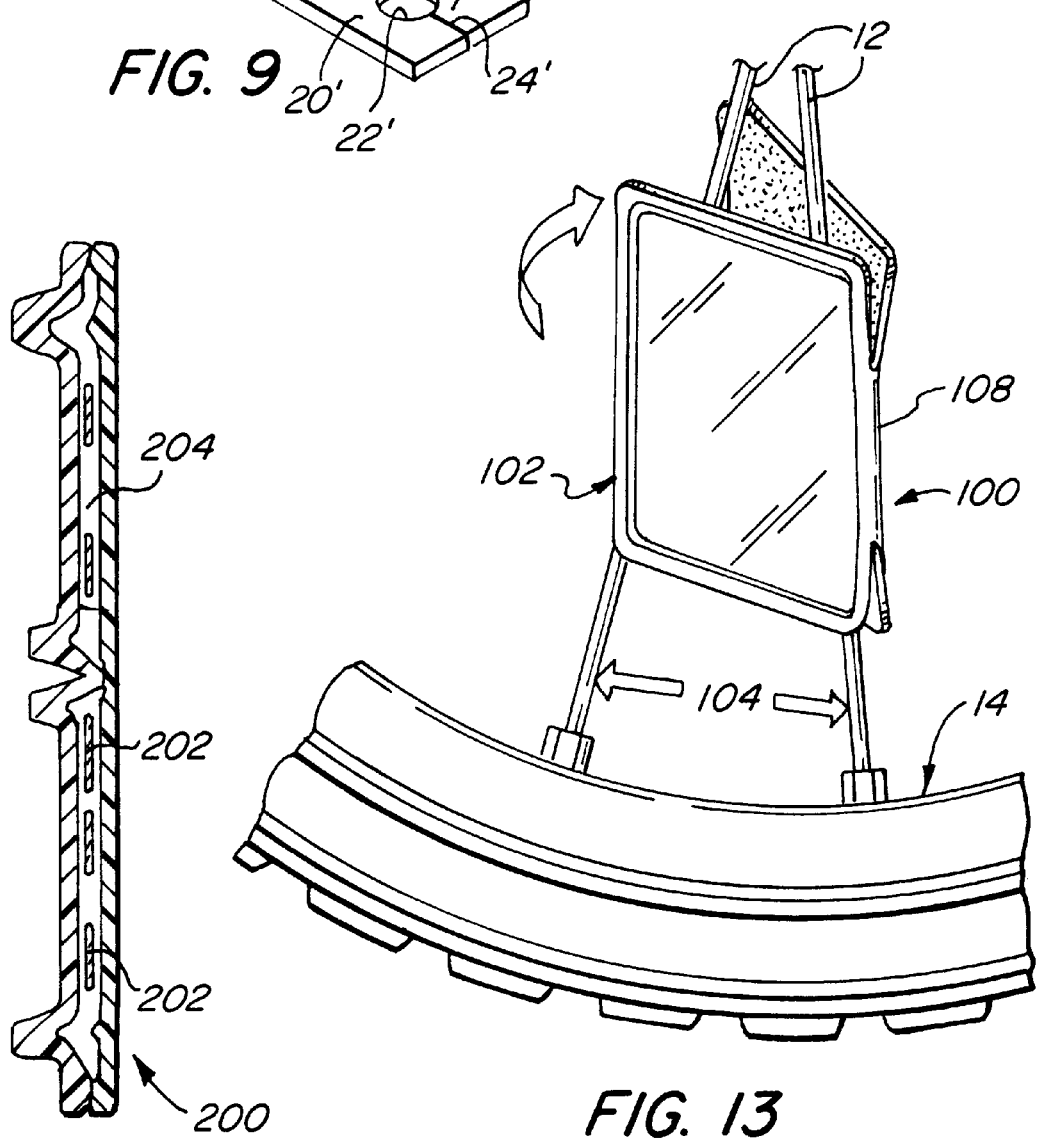

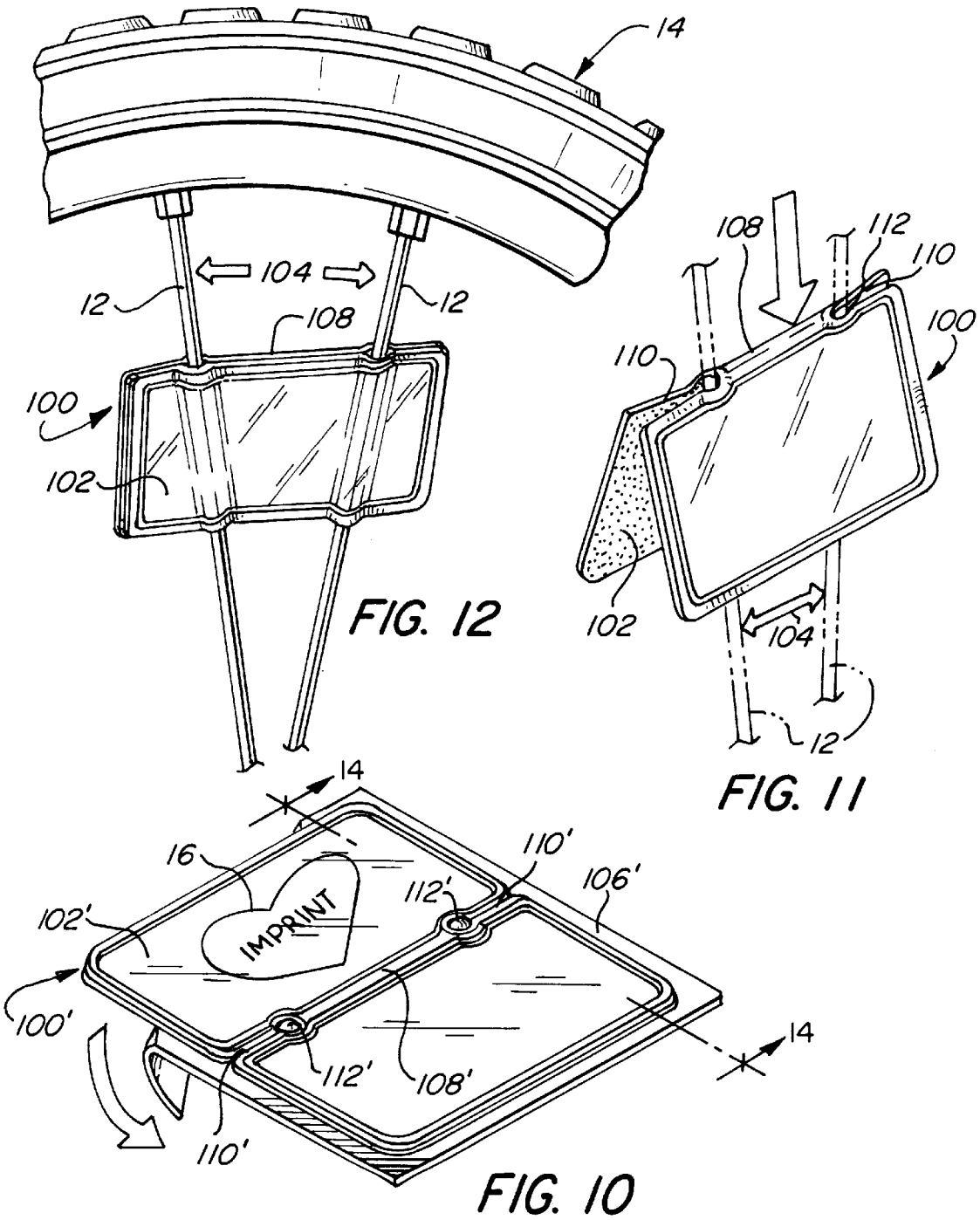

5,923,483

SELF-ATTACHABLE WHEEL SPOKE REFLECTOR

FIELD OF THE INVENTION

The invention relates to spoke reflectors, and more specifically to self-attachable wheel spoke reflectors sold as novelty items.

BACKGROUND OF THE INVENTION

Wheel spoke reflectors known in the art are rigid. These rigid wheel spoke wheel reflectors are of two types. One type of wheel spoke reflector of the prior art requires screws for attachment to wheel spokes. These wheel spoke reflectors are made of rigid plastics that are injection molded. They tend to have multiple components, to be expensive, to have low impact strength, require tools for attaching to wheel spokes, and can rust.

Another type of rigid wheel spoke reflectors do not require screws for attachment and have rigid snap fasteners requiring significant force to attach to a wheel spoke. These wheel spoke reflectors tend to be complicated to attach and expensive.

What is desired, therefore, is a wheel spoke reflector that is easily attached to wheel spoke, is waterproof, is relatively simple to manufacture and is inexpensive. Further, an inexpensive wheel spoke reflector that is capable of being formed with intricate patterns, dots, fluorescent encapsulants or holographics at low cost is desired. In addition, a reflective sheet containing a plurality of wheel spoke reflectors that can be removed from the sheet and then attached to the wheel spoke is further desired.

SUMMARY OF THE INVENTION

In accordance with two embodiments of the present invention, a wheel spoke reflector is provided that has a cut in opposing end portions defining pincers to attach the wheel spoke reflector to a wheel spoke or that has adhesive-backing and cuts for adhering to and accommodating the wheel spokes. These embodiments may be provided in sheet form having multiple removable reflectors.

Accordingly, it is an object of the invention to provide a wheel spoke reflector that is inexpensive.

Another object of the invention is to provide a wheel spoke reflector that is easily attached to the wheel spoke and yet stays on the wheel spoke.

Still another object of the invention is to provide a wheel spoke reflector that is supplied in sheet form, and is waterproof.

Another object of the invention is to provide a wheel spoke reflector that is adhesive-backed.

Yet still another object of the invention is to provide a wheel spoke reflector of the above character that can have intricate puffy or patterned shapes on its surface.

Still another object of the invention is to provide a wheel spoke reflector of the above character which can include multiple layers, such as a reflective layer, areas of luminescence, reflective dots, or holographics which are sealed or sandwiched together.

These and other objects are achieved by providing a main body that includes fold lines defining opposing foldable end portions. Opposing end portions have cuts and holes sized so as to frictionally receive a wheel spoke. Cuts in the opposing end portions define flexible pincers allowing entry of the wheel spoke. In yet another aspect of the invention, wheel spoke reflector is formed of a reflective sheet that includes at least one removable wheel spoke reflector that can be separated and individually removed from the reflective sheet.

BRIEF DESCRIPTION OF THE DRAWINGS

FIG. 3 is a front isometric view of one embodiment of a self-attachable wheel spoke reflector in accordance with the invention;

FIG. 4 is a top exploded view of an end portion of the wheel spoke reflector of FIG. 3;

FIG. 6 is side view from the end portion of the wheel spoke reflector of FIGS. 3 and 4;

FIG. 7 is a side plan view of one embodiment of self-attachable wheel spoke reflector of FIG. 3 showing its attachment to wheel spoke in accordance with the present invention;

FIG. 8 is a front isometric view of the self-attachable wheel spoke reflector of FIG. 3 showing it attached to a wheel spoke;

FIG. 9 is a front isometric view of another embodiment of the self-attachable wheel spoke reflector in accordance with the present invention showing it attached to a wheel spoke;

FIG. 10 is a front isometric view of another embodiment of the attachable wheel spoke reflector in accordance with the present invention;

FIG. 11 is a front isometric view of the self-attachable wheel spoke reflector of FIG. 10 depicting its attachment to wheel spokes in accordance with the present invention;

FIG. 12 is a front plan view of the self-attachable wheel spoke reflector of FIG. 10 showing it attached to wheel spokes;

FIG. 13 is a front plan view of another embodiment of the self-attachable wheel spoke reflector in accordance with the present invention showing its attachment to wheel spokes; and FIG. 14 is a side sectional view of FIG. 10 taken along section line 14—14.

DETAILED DESCRIPTION OF THE INVENTION

Figures 1, 2:
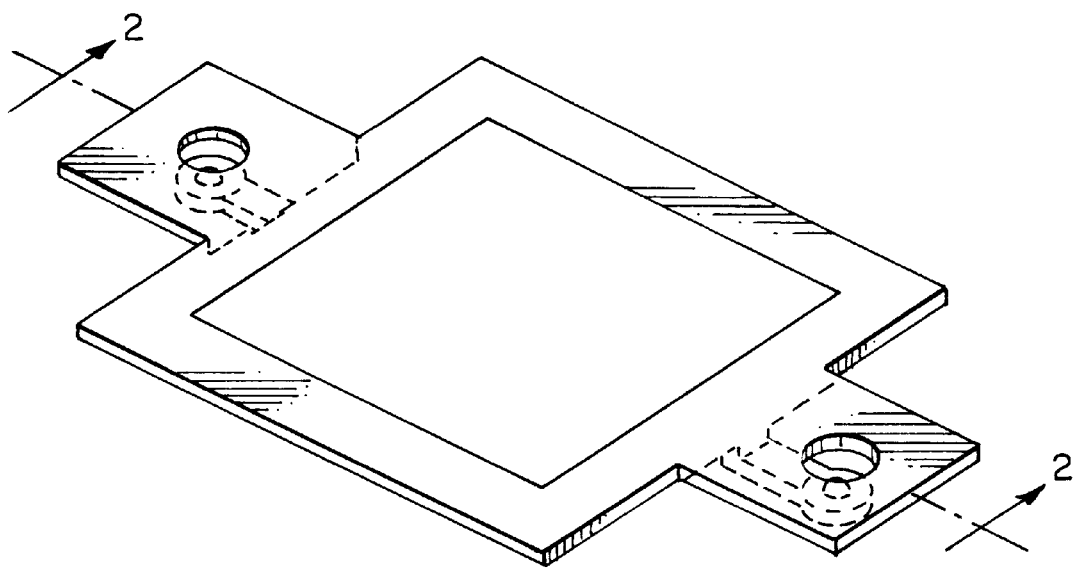
FIGS. 1 and 2 are front isometric and side views, respectively, of the prior art.

FIGS. 3, 4, and 6–8 depict a self-attachable flexible wheel spoke reflector 10 in accordance with the present invention. Self-attachable flexible wheel spoke reflectors 10 are most likely intended for use on spokes 12 of bicycle wheels 14. It is understood, however, that attachable wheel spoke reflectors 10 can be used with any article of manufacture having a spoke-like member to which it can be attached such as wheelchairs, baby carriages or motorcycles. Although vinyl is the preferred material, it is understood that other plastics or other polymeric or metal materials may be used, especially those that can be die cut and are resilient, and most preferred is a weather-resistant and waterproof material that can be decorated with puffy shapes 16 (as shown in FIG. 10) or printing.

As shown in FIGS. 3, 4, and 6–8 self-attachable flexible wheel spoke reflector 10 generally comprises main body 18 having fold lines 30 defining opposing end portions 20 with holes 22 and cuts 24 (shown in detail in FIGS. 4 and 6) forming pincers 26 so as to accept and hold wheel spoke 12.

Hole 22 is of sufficient width to snugly snap onto spoke 12, but is still wide enough to allow reflector 10 freedom without friction to slide up and down and to freely rotate to not only make a clicking noise (at slow speeds), but to make the bicycle visible to approaching motorists from many different directions.

Figure 5:
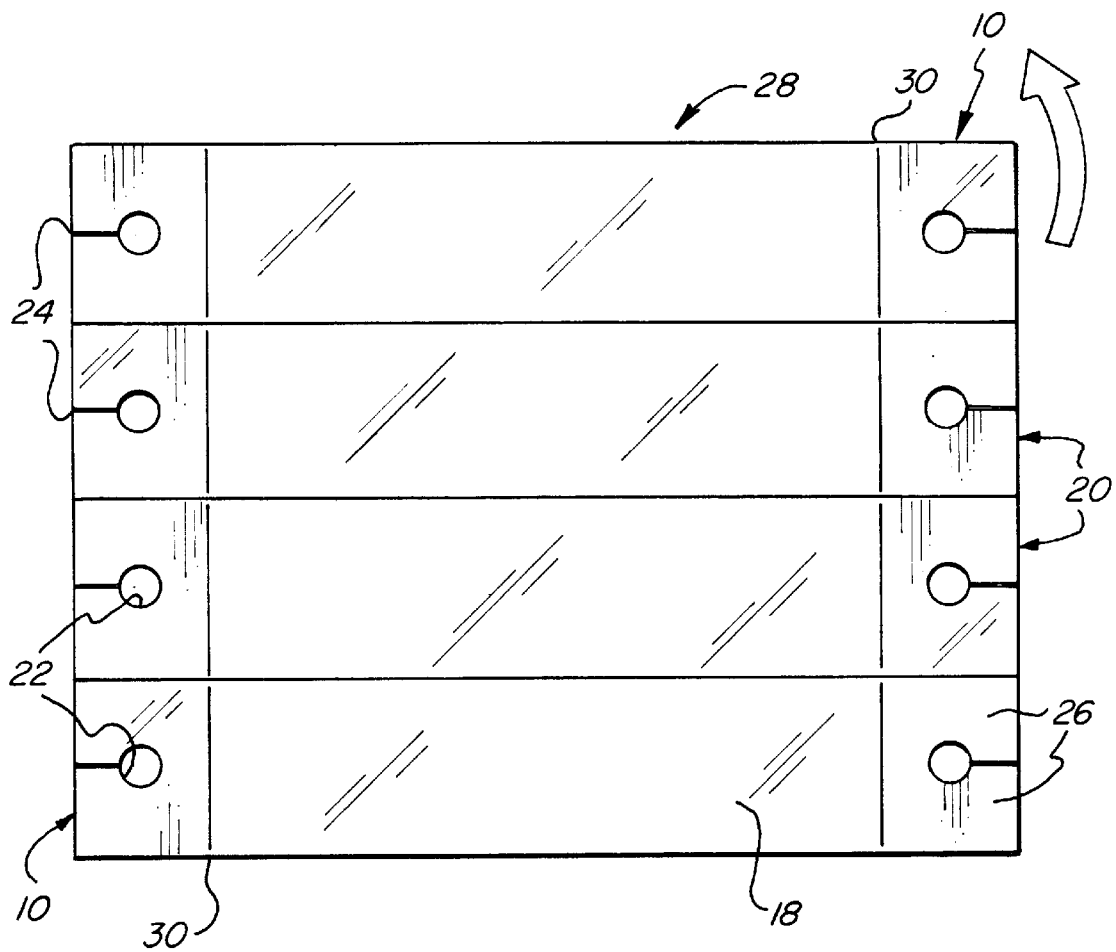
FIG. 5 is a top view of another embodiment of the present invention.

FIG. 5 shows vinyl reflective sheet 28 including four self-attachable wheel spoke reflectors 10 of one embodiment of the present invention separably held and individually removable from reflective sheet 28. It is understood that reflective sheet 28 can comprise a plurality of self-attachable wheel spoke reflectors 10. FIG. 5 further shows each self-attachable wheel spoke reflector 10 separably held adjacent to each other self-attachable wheel spoke reflector 10 in the sheet 28 and having main body, fold lines 30, end portions 20, holes 22, cuts 24, and pincers 26.

FIGS. 7 and 8 show the method of attaching the self-attachable wheel spoke reflector 10 (of FIG. 3) attaching and attached, respectively, to a wheel spoke 12. FIG. 7 shows opposing end portions 20 having fold lines 30 bending from the plane 35 of main reflector body 18. In another embodiment of the self-attachable wheel spoke reflector 10, holes 22 shall be sized so as to allow rotation and an up and down sliding motion of the self-attachable wheel spoke reflector 10.

FIG. 9 depicts another embodiment of the wheel spoke reflector 10' in accordance with the present invention having opposing end portions 20' oriented transversely to the elongate axis of main reflector body 18', rather than in line with the elongate axis of main reflector body 18 as shown in FIGS. 3, 4, 5, 7, and 8. The end portions 20', like 20, have holes 22', pincers 26', and cuts 24'. Although wheel spoke reflector embodiment 10 depicted in FIGS. 3, 4, 5, 7 and 8 is preferred over embodiment 10' shown in FIG. 9, it is understood that self-attachable wheel spoke reflectors 10' can have end portions 20' with different orientations relative to main reflector body 18', as shown in FIG. 9.

FIGS. 10–13 depict another embodiment for self-attachable flexible wheel spoke reflector 100 in accordance with the present invention. Wheel spoke reflector 100 generally comprises adhesive-backed main reflector body 102 being foldable to allow main reflector body 102 to bend back on itself, and having at least one dimension that is longer than the span 104 between adjacent wheel spokes 12. FIG. 11 depicts adhesive-backed wheel spoke reflector 100 being bent back on itself at fold line 108 and adhering to two adjacent wheel spokes 12 by pushing two adjacent wheel spokes into cuts 110, crossing span 104 between these two adjacent wheel spokes 12 for attachment to spokes 12 as shown in FIG. 12 or as in FIG. 13.

FIG. 10 shows another embodiment of the present invention wherein self-attachable wheel spoke reflector 100' is provided on a release liner 106 and removable therefrom wheel spoke reflector 100' having a main reflector body 102' with holes 112', cuts 110' and fold line 108'.

Self-attachable wheel spoke reflectors 10, 10' and 100 are manufactured by starting with a sheet material. As discussed above, this sheet material can be multi-layer 200 (see FIG. 14) or single layer, and vinyl or other Self-polymer or metal or puffy material to make puffy shapes 16 (see FIG. 10). The starting sheet material is preferably of a waterproof material, such as vinyl. For the embodiments depicted in FIGS. 10–13, the starting sheet material can be adhesive-backed or the starting sheet material can be non-adhesive-backed and can be coated with, or sealed to, an adhesive layer and release liner.

The preferred method of manufacture is Radio Frequency (RF) sealing of various layers of vinyl materials together to form the product, and is well-known. RF sealing will allow a top protective layer of a clear or tinted vinyl (optional) to be layered over a vinyl containing a reflective element and/or a luminescent or holographic element, and these layers to be placed over an adhesive backed PVC sheet attached to a release liner 106. The RF sealing process will seal all layers together and simultaneously cut out the shape and provide scoring where desired. A multi-level die is used with cutting and scoring levels. The cutting edges of the die are slightly higher than scoring edges of the die, depending upon the thickness of the sheet material being processed. These scoring edges are lower relative to the cutting edges of the die so as to avoid cutting through the sheet material.

Die-cutting and scoring occur in one step. Self-attachable wheel spoke reflectors 10, 10' and 100 can be made removable from reflective sheet 28 using scoring edges of die. A plurality of self-attachable sheet spoke scoring reflectors 10, 10' or 100 can be formed using multiple dies adjacent to one another. Preferably, these dies can be arranged so as to leave minimal sheet material between self-attachable wheel spoke reflectors 10, 10' or 100 reducing material waste and costs. A section of reflective sheet 28 having a plurality of self-attachable wheel spoke reflectors 10, 10' or 100 or single wheel spoke reflector 10, 10' or 100 can be sold to a customer. It is understood that scoring includes perforations, cuts, heating or other method for weakening sheet material.

Holes 22 or 112 can formed in self-attachable wheel spoke reflector 10, 10' or 100 using the preferred RF sealing process, or depending on materials used, a die cutting and scoring operation can also be used. Shapes 16 creating a multidimensional effect can be embossed into the reflector during the RF sealing process when forming the reflector. Self-attachable wheel spoke reflectors 10, 10' or 100 can be printed in one or more colors at the same time the reflectors 10, and 100 are die-cut and scored.

Another embodiment of the invention can be made by beginning with starting sheet material having multiple layers 200 as shown in FIG. 14. In this way layers 200 can be adhered to each other by the RF sealing process in accordance with the present invention. Fluorescent liquids 204 or decorative, or reflective holographic or dots 202 may be used or introduced between layers 200 so that they can be viewed through layer 200 and captured therebetween. Further, layer 200 can be weather-resistant and waterproof. The top protective layer may optionally be printed in one or more colors, on its surface or on its underside, in standard inks, fluorescent inks, and/or luminescent inks. The second layer will generally comprise a reflective surface that may be created on a plain or a holographic background. In some embodiments, the reflective surface is the top layer and it may or may not be printed. All these layers can be sealed to a pressure sensitive vinyl base, such as a PVC sheet with adhesive on its underside protected by a release liner.

Although the invention has been described with reference to a particular arrangement of components, features and the like, these are not intended to exhaust all possible arrangements or features, and indeed many other modifications and variations will be ascertainable to those of skill in the art consistent with this disclosure.

What is claimed is:

1. A self-attachable vinyl wheel spoke reflector comprising at least one sheet of vinyl reflective material having fold lines to define opposing foldable end portions with holes and cuts forming flexible pincers so as to accept and hold at least one wheel spoke, and main body portion between said foldable end portions for reflecting light.

2. The self-attachable vinyl wheel spoke reflector as in claim 1, wherein the opposing end portions have holes sized so as to frictionally receive a wheel spoke and cuts, formed by die-cutting, extending into the end portions to their holes to define flexible pincers past which a wheel spoke can be pushed to seat in the holes for frictionally holding the wheel spoke therein.

3. A self-attachable vinyl wheel spoke reflector as in claim 1, wherein said main reflector body and end portions are adhesive-backed.

4. The self-attachable vinyl wheel spoke reflector as in claim 1 wherein said main body portion includes multiple layers, at least one layer being selected from the group consisting of a fluorescent material, a luminescent material, a reflective material, or a holographic material.

5. A self-attachable vinyl wheel spoke reflector as in claim 3 wherein the fold line has holes positioned on the fold lines for receiving a wheel spoke.

6. An array of self-attachable vinyl wheel spoke reflectors, comprising:

at least one sheet of vinyl reflective material having fold lines to define opposing foldable end portions with holes and cuts forming flexible pincers so as to accept and hold at least one wheel spoke, and main body portion between said foldable end portions for reflecting light; and said self-attachable vinyl wheel spoke reflector being separably held adjacent to any other said self-attachable vinyl wheel spoke reflectors and individually removable therefrom by scoring.

* * * * *